(12) United States Patent
Seymour et al.

(10) Patent No.: US 8,060,821 B2
(45) Date of Patent: Nov. 15, 2011

(54) ENHANCED VISUAL FEEDBACK OF INTERACTIONS WITH USER INTERFACE

(75) Inventors: Eric Seymour, San Jose, CA (US); Kevin B. Aitken, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 147 days.

(21) Appl. No.: 11/298,977

(22) Filed: Dec. 9, 2005

(65) Prior Publication Data
US 2007/0136692 A1    Jun. 14, 2007

(51) Int. Cl.
*G06F 3/048* (2006.01)

(52) U.S. Cl. ........ 715/711; 715/715; 715/729; 715/744; 715/781

(58) Field of Classification Search ............ 715/744, 715/809, 715, 711, 835, 708, 802, 763, 739; 701/1; 704/275
See application file for complete search history.

(56) References Cited

U.S. PATENT DOCUMENTS

| | | | | |
|---|---|---|---|---|
| 5,448,695 | A * | 9/1995 | Douglas et al. | 715/809 |
| 5,625,763 | A | 4/1997 | Cirne | |
| 5,914,714 | A | 6/1999 | Brown | |
| 5,929,852 | A | 7/1999 | Fisher et al. | |
| 5,995,101 | A * | 11/1999 | Clark et al. | 715/711 |
| 6,233,560 | B1 * | 5/2001 | Tannenbaum | 704/275 |
| 6,297,819 | B1 | 10/2001 | Furst | |
| 6,344,855 | B1 | 2/2002 | Fisher et al. | |
| 6,426,761 | B1 | 7/2002 | Kanevsky et al. | |
| 6,448,986 | B1 | 9/2002 | Smith | |
| 6,529,804 | B1 * | 3/2003 | Draggon et al. | 701/1 |
| 6,724,403 | B1 | 4/2004 | Santoro et al. | |
| 6,915,490 | B1 | 7/2005 | Ewing | |
| 6,947,967 | B2 | 9/2005 | Ferris et al. | |
| 6,948,094 | B2 | 9/2005 | Schultz et al. | |
| 6,948,126 | B2 * | 9/2005 | Malamud et al. | 715/715 |
| 7,051,096 | B1 | 5/2006 | Krawiec et al. | |
| 7,222,306 | B2 | 5/2007 | Kaasila et al. | |
| 7,480,863 | B2 * | 1/2009 | Branson et al. | 715/711 |
| 2002/0112237 | A1 | 8/2002 | Kelts | |
| 2002/0122053 | A1 | 9/2002 | Dutta et al. | |
| 2003/0164848 | A1 | 9/2003 | Dutta et al. | |
| 2003/0210266 | A1 | 11/2003 | Cragun et al. | |
| 2004/0056900 | A1 * | 3/2004 | Blume | 345/807 |
| 2004/0186713 | A1 | 9/2004 | Gomas et al. | |
| 2004/0261031 | A1 * | 12/2004 | Tuomainen et al. | 715/739 |

(Continued)

OTHER PUBLICATIONS

U.S. Appl. No. 10/956,720, filed Oct. 1, 2004, Seymour et al.
U.S. Appl. No. 11/643,257, filed Dec. 20, 2006, Seymour et al.
U.S. Appl. No. 11/643,389, filed Dec. 20, 2006, Seymour et al.

*Primary Examiner* — William L Bashore
*Assistant Examiner* — Sherrod Keaton
(74) *Attorney, Agent, or Firm* — Fish & Richardson P.C.

(57) ABSTRACT

An item in a user interface is visually enhanced in response to an interaction with the item or in response to a request. In some implementations, the item (e.g., an icon, button, text, etc.) is visually enhanced and displayed in the user interface at a conspicuous location (e.g., the center of the user interface). Optionally, the user interface can be altered (e.g., darkened) to improve the visibility of the enhanced item. In some implementations, visual enhancement includes displaying enhanced feedback (e.g., text, data, graphical objects or images, etc.) associated with the item in a caption panel. The caption panel can display enhanced feedback associated with any items in the user interface and not just the item associated with a current user interaction. In some implementations, the user can interact with items (e.g., launch an application) from within an interaction panel.

39 Claims, 5 Drawing Sheets

U.S. PATENT DOCUMENTS

| | | |
|---|---|---|
| 2005/0071165 A1 | 3/2005 | Hofstader et al. |
| 2005/0149458 A1 | 7/2005 | Eglen et al. |
| 2005/0246651 A1 | 11/2005 | Krzanowski |
| 2006/0150099 A1* | 7/2006 | Laff et al. .................... 715/708 |
| 2006/0274086 A1 | 12/2006 | Forstall et al. |
| 2007/0002035 A1* | 1/2007 | Plut .............................. 345/211 |
| 2007/0005206 A1* | 1/2007 | Zhang et al. .................... 701/36 |
| 2007/0028178 A1* | 2/2007 | Gibson et al. ................. 715/760 |
| 2007/0041666 A1 | 2/2007 | Nagamine et al. |

* cited by examiner

ENHANCED VISUAL FEEDBACK OF INTERACTIONS WITH USER INTERFACE

RELATED APPLICATIONS

This application is related to U.S. patent application Ser. No. 10/965,720, filed Oct. 1, 2004, entitled "Spoken Interfaces," and U.S. patent application Ser. No. 11/145,023, filed Jun. 3, 2005, entitled "Clipview Applications". Each of these patent applications is incorporated by reference herein in its entirety.

TECHNICAL FIELD

The disclosed implementations relate to graphical user interfaces.

BACKGROUND

A conventional computing system (e.g., a personal computer) includes one or more types of input/output devices (e.g., mouse, keyboard, display, etc.) for enabling users to interact with the computer system. Individuals with disabilities, however, may require additional hardware devices and/or accessibility applications to facilitate their interaction with the computer system. An example of an accessibility application is described in U.S. patent application No. 10/965,720, entitled "Spoken Interfaces." That patent application discloses an "accessibility cursor" that can be navigated around a user interface using a keyboard. The accessibility cursor enables impaired users and/or their collaborators to interact with items in the user interface and to receive audio and visual feedback related to the interaction. The user can use the cursor to press buttons, drag sliders, enable and disable check boxes, select radio buttons, drag, scroll, etc.

Although an accessibility cursor can enable a disabled user to more easily navigate a user interface, a vision-impaired user may still experience pain or discomfort when trying to track cursor movements. Additionally, it can be difficult for individuals who collaborate with a vision-impaired user to track the user's interactions with the interface and provide assistance to the user.

SUMMARY

An item in a user interface is visually enhanced in response to an interaction with the item or in response to a request. In some implementations, the item (e.g., an icon, button, text, application launcher, shortcut, link, directory, folder, file, etc.) is visually enhanced and displayed in the user interface at a conspicuous location (e.g., the center of the user interface). Optionally, the user interface can be altered (e.g., darkened) to improve the visibility of the enhanced item. In some implementations, visual enhancement includes displaying enhanced feedback (e.g., text, data, graphical objects or images, etc.) associated with the item in a caption panel. A caption panel can display enhanced feedback associated with items in the user interface and not just the item associated with a current user interaction. In some implementations, the user can interact with items (e.g., launch an application) from within an interaction panel.

In some implementations, a method of enhancing visual feedback in a user interface includes: receiving a request to visually enhance an item in a user interface; visually enhancing the item; displaying the visually enhanced item in the user interface at a conspicuous location; and adjusting the user interface to improve the visibility of the item.

In some implementations, a method of enhancing visual feedback in a user interface includes: providing a panel conspicuously displayed within a graphical user interface; detecting an interaction event, the interaction event associated with an item within the graphical user interface; and determining enhanced feedback for the panel, the enhanced feedback describing the interaction event.

In some implementations, a method of enhancing visual feedback in a user interface includes: detecting interaction events, each interaction event associated with an item presented at a location within a graphical user interface; providing a panel within the graphical user interface to conspicuously display content associated with an item associated with the interaction event, the panel displayed at a location that is different from the location associated with the item.

In some implementations, a method of enhancing visual feedback in a user interface includes: detecting interaction events, an interaction event being associated with one or more items presented at locations within a graphical user interface; coincident with an interaction event, providing a common interaction space in the graphical user interface window to conspicuously display content associated with a given interaction, a location of the common interaction space being different from locations associated the items and interaction events; and contrasting the graphical user interface to graphically emphasize items displayed within the common interaction space and graphically deemphasize content displayed outside of the common interaction space.

In some implementations, a method of enhancing visual feedback in a user interface includes: detecting interaction events, an interaction event being a user interaction with a device that includes a graphical user interface and including a designated portion of the graphical user interface for receiving and responding to the interaction event; and coincident with an interaction event, providing a common interaction space in the graphical user interface window to conspicuously display content associated with a given interaction, a location of the common interaction space being different from the designated portion of the graphical user interface associated with interaction event.

Various other implementations are disclosed that are directed to methods, systems, devices, user interfaces and computer-readable mediums.

DETAILED DESCRIPTION

System Overview

Figure 1:
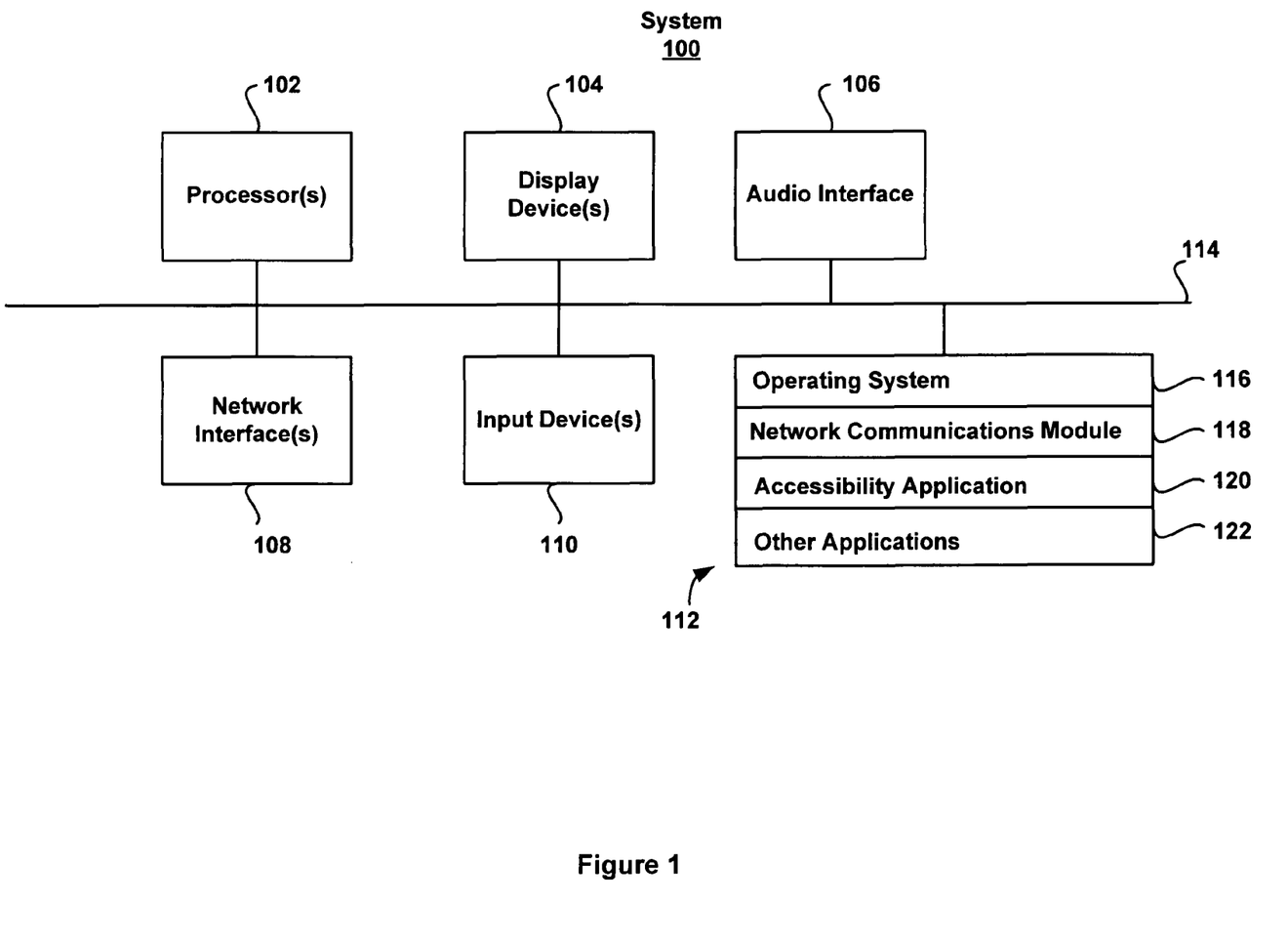
FIG. 1 is a block diagram of a system for providing enhanced visual feedback of interactions with a user interface.

FIG. 1 is a block diagram of a system 100 for providing enhanced visual feedback of interactions with a user interface. Although the architecture of the system 100 is typical of a computing device (e.g., a personal computer), the disclosed implementations can be realized in any device capable of presenting a user interface on a display device, including but not limited to: desktop or portable computers; electronic devices; telephones; mobile phones; display systems; televisions; monitors; navigation systems; portable media players; personal digital assistants; game systems; handheld electronic devices; and embedded electronic devices or appliances.

The system 100 includes one or more processors 102 (e.g., CPU), one or more display devices 104 (e.g., CRT, LCD, etc.), an audio interface 106 (e.g., a sound card for interfacing with speakers), one or more network interfaces 108 (e.g., USB, Ethernet, FireWire® & ports, etc.), one or more input devices 110 (e.g., mouse, keyboard, etc.) and one or more computer-readable mediums 112. Each of these components is coupled by one or more buses 114 (e.g., EISA, PCI, USB, FireWire® &, NuBus, PDS, etc.).

The term "computer-readable medium" refers to any medium that participates in providing instructions to a processor 102 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium(s) 112 further includes an operating system 116 (e.g., Mac OS®, Windows®, Unix, Linux, etc.), a network communications module 118 and an accessibility application 120.

The operating system 116 can be multi-user, multiprocessing, multitasking, multithreading, real-time and the like. The operating system 116 performs basic tasks, including but not limited to: recognizing input from input devices 110; sending output to display devices 104; keeping track of files and directories on storage devices 112; controlling peripheral devices (e.g., disk drives, printers, image capture device 106, etc.); and managing traffic on the one or more buses 114.

The network communications module 118 includes various components for establishing and maintaining network connections (e.g., software for implementing communication protocols, such as TCP/IP, HTTP, Ethernet, USB, FireWire®, etc.). For example, the network communications module 118 can include a modem driver and other telephony components for enabling remote navigation of a user interface using a telephony device.

The accessibility application 120 provides various software components for performing processes described with respect to FIGS. 2-5. In some implementations, some or all of the processes performed by the accessibility application 120 can be integrated into the operating system 116. The disclosed implementations can be implemented in digital electronic circuitry, or in computer hardware, firmware, software, or in any combination thereof.

Other applications 122 can include any other software application, including but not limited to: word processors, browsers, email, Instant Messaging, media players, telephony software, etc.

Tiling Process

Figure 2:
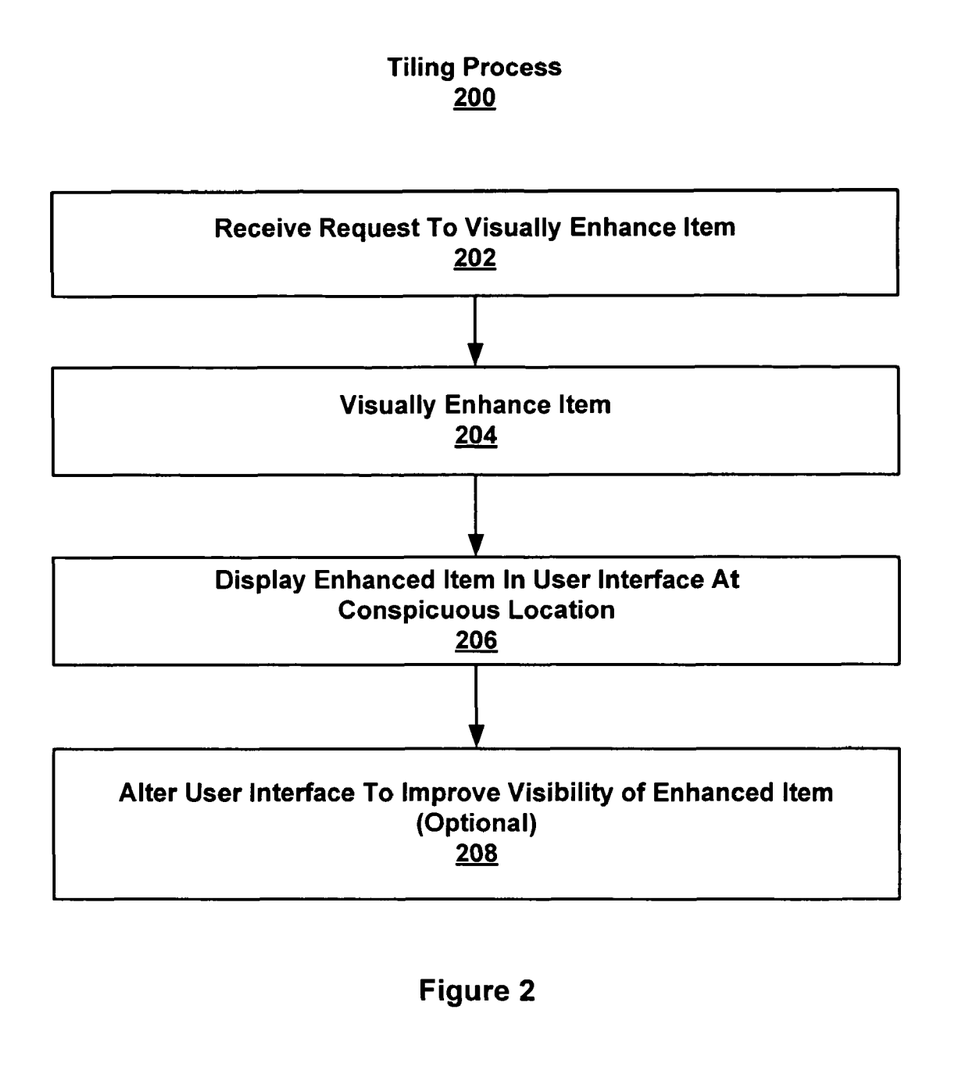
FIG. 2 is a flow diagram of a tiling process for providing enhanced visual feedback of interactions with a user interface.

FIG. 2 is a flow diagram of a tiling process 200. In some accessibility applications, a user and/or collaborator uses a keyboard to navigate an accessibility cursor around a user interface. One such accessibility application is described in U.S. patent application Ser. No. 10/956,720, entitled "Spoken Interfaces." For some visually-impaired users, however, it may be painful or uncomfortable to track cursor movements around the user interface. Additionally, a collaborator may also have trouble following the user's interactions with the interface.

In some implementations, the process 200 begins when the system 100 receives a request to visually enhance an item displayed in a user interface (202). The request can be generated by an operating system (e.g., desktop) and/or by an application (e.g., media player, browser, email, word processor, etc.). In some implementations, a request can be made by a user through an input device (e.g., keyboard, mouse, joystick, trackball, etc.). For example, a user can press a function key or key combination on a keyboard to invoke the process 200. In other implementations, a request is automatically (e.g., programmatically) generated when the user interacts with an item in the user interface using, for example, the "accessibility cursor" described in U.S. patent application Ser. No. 10/956,720, entitled "Spoken Interfaces."

In response to the request, one or more items are visually enhanced by modifying one or more attributes associated with the item(s) (204). An item can be any user interface element or combination of user interface of elements, including but not limited to: a graphical object, icon, button, text, a portion of the graphical user interface, an application launcher, a shortcut or other link, a directory, folder or file, etc. An item can be part of any user interface, including a desktop or a user interface generated by an application.

In some implementations, the item enhanced is the item that the user is currently interacting with in the user interface. For example, the item that is currently pointed to, selected, hovered on, or focused upon by an accessibility cursor or other navigation mechanism is enhanced. Items can have one or more attributes or properties that can be visually enhanced, including but not limited to: font, color, style, magnification, animation, highlighting, etc.

In some implementations, the visually enhanced item is displayed in the user interface in a common interaction space, or at a conspicuous location within the user interface (206). A conspicuous location does not have to be located near the item but can be anywhere in the user interface. A conspicuous location can be, for example, the center of the display screen or in a panel, as described with respect to FIGS. 4 and 5. The panels can be displayed by themselves in an obfuscated user interface or over other items within the user interface.

In some implementations, the user interface can be altered to improve the visibility of the enhanced item (208). Altering the user interface can include, for example, darkening the user interface, coloring the item and/or brightening the item, to create a sharper contrast between the item and the user interface. For some vision impaired users, the contrast of an enhanced item displayed against a dark background improves the visibility of the enhanced item.

The process 200 can be illustrated by the following example. An impaired user and/or collaborator is working in a word processing application and wants to underline some highlighted text. She selects an "underline" button in a word processor tool bar with an accessibility cursor. The user is having difficulty seeing the relatively small underline button in the tool bar, so she presses a function key invoking the process 200. In response to the user pressing the function key, the underline button is magnified and displayed in the center of the user interface. Alternatively, the entire tool bar, or portion of the tool bar, is magnified and displayed in the center of the user interface, depending on default settings or preferences which can be set by the user. Additionally, the user interface is darkened to improve the visibility of the magnified button. The display of the enhanced underline button and the darkening of the user interface can be performed substantially at the same time, so that the various steps of process 200 appear to occur simultaneously from the user's perspective.

It should be apparent that the steps of process 200 do not necessarily have to be performed in a specific order, and that at least some steps can be performed in parallel in a multithreading or multiprocessing computing environment.

Captioning Process

Figure 3:
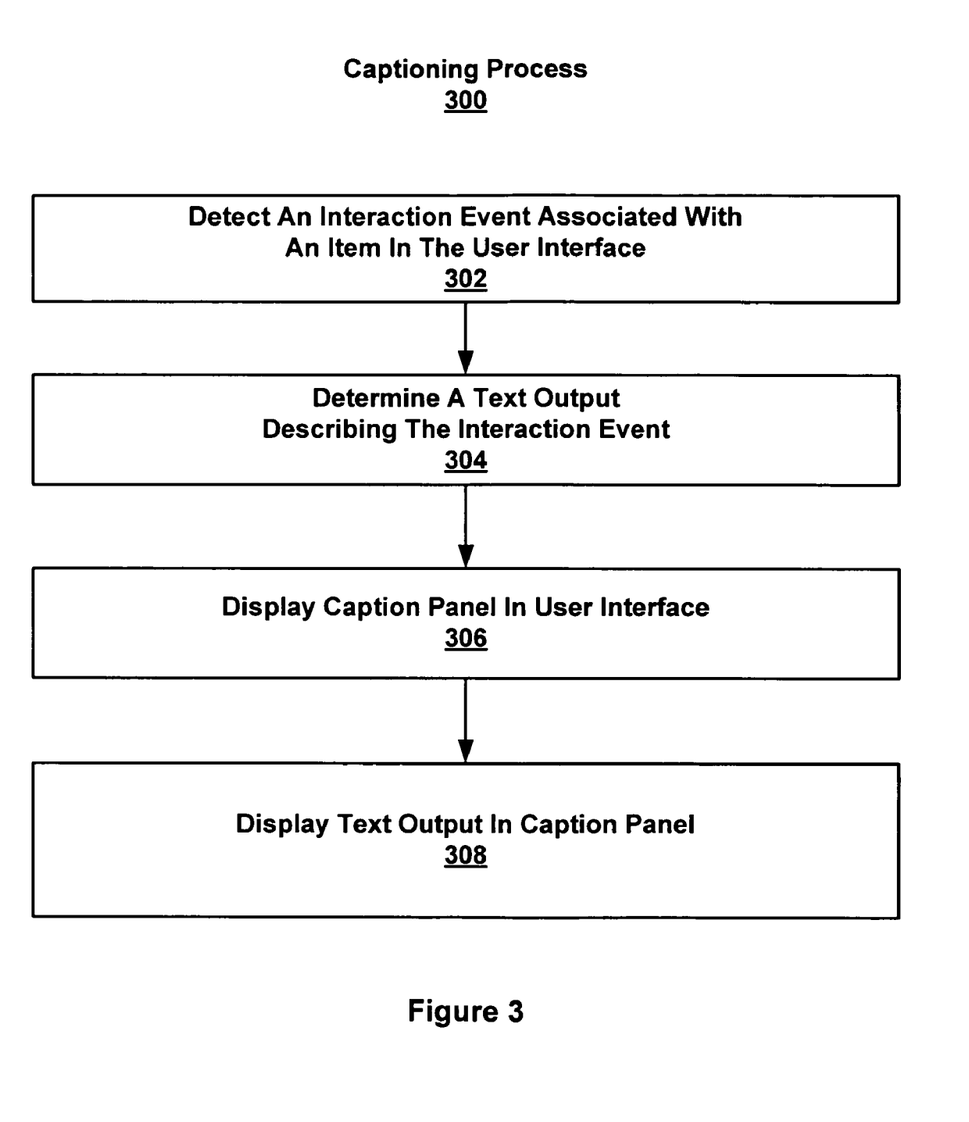
FIG. 3 is a flow diagram of a captioning process for captioning user interaction events.

FIG. 3 is a flow diagram of a process 300 for captioning user interaction events. In some implementations, the process 300 begins when an interaction event is detected (302). Interaction events can be detected by various components of the operating system (e.g., mouse driver, keyboard driver, etc.), alone or in combination with an accessibility application (e.g., accessibility application 120). Interaction events include but are not limited to: a click from a mouse button or other selection device, a directional command from a mouse or other pointing device, keyboard input, a voice command from a user, selection of text, audio output, selection of an item, a mouse-over for an item, and any other interaction with system and/or application items. In some implementations, interaction events are automatically generated by moving a cursor or other navigation mechanism within a graphical user interface, as described in U.S. patent application Ser. No. 10/956,720, entitled "Spoken Interface."

An interaction event can be caused directly or indirectly by the user, and can be directed at items displayed at different levels within the user interface (e.g., desktop level, window level, application level, folder level, etc.). An interaction event can have an associated audio output that is played for the user. For example, the text output provided in a caption panel can be converted to speech and provided as audio output via an audio interface (e.g., audio interface 106).

Figure 4A:
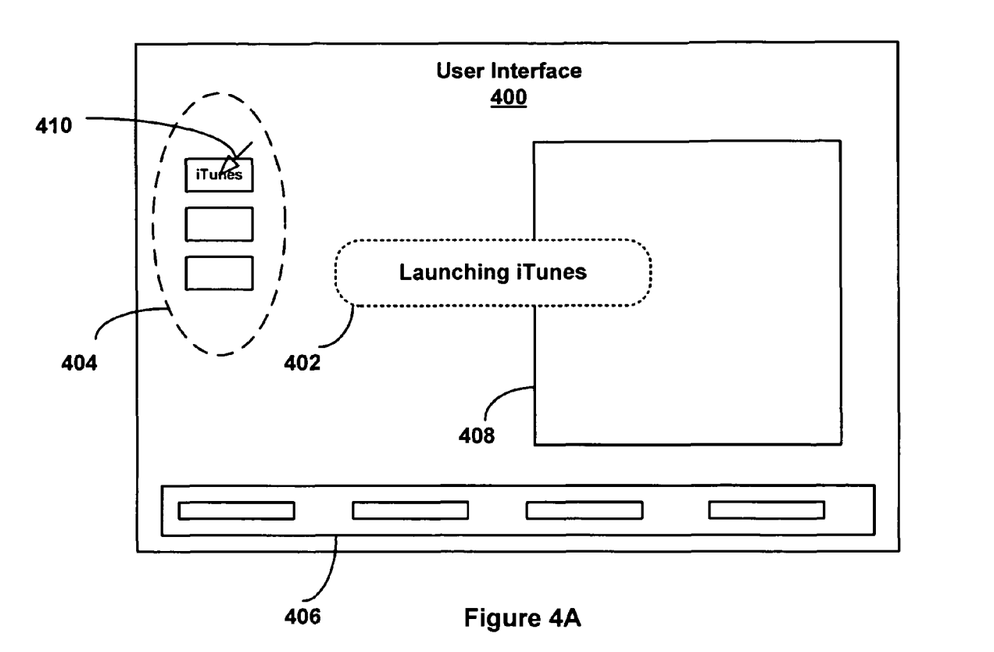
FIG. 4A is an illustration of a user interface displaying enhanced feedback in a caption panel in response to interaction with a desktop item.

After a user interaction event is detected, enhanced feedback (e.g., text output, graphical object, etc.) describing and/or related to the interaction event is determined (304). In some implementations, an operating system converts user input to commands (e.g., higher level syntax) which are mapped to a predetermined text output. For example, a command to position a cursor over an icon and a command to select the icon can map to the text output "Launching Application," as illustrated in FIG. 4A. In some implementations, text output from various sources can be concatenated or otherwise combined into a single text message.

In some implementations, the enhanced feedback is captured directly from the user interface (e.g., a clip view), as described in U.S. patent application Ser. No. 11/145,023, entitled "Clipview Applications". Alternatively, the text output is captured directly from an application window (e.g., from an email message window) without text mapping, as illustrated in FIG. 4B.

In some implementations, a text output can be parsed for symbols and other text that is spoken differently from how it is written. One example of symbol parsing is to convert the symbol "$" to "dollar(s)." Symbol parsing can be bi-directional. When text is the input, symbols in the text (e.g., the "$" symbol) can be parsed to produce speech output that includes a corresponding word or phrase ("dollar(s)"). Where speech is the input, words or phrases can be parsed from the speech to produce symbols.

Figure 4B:
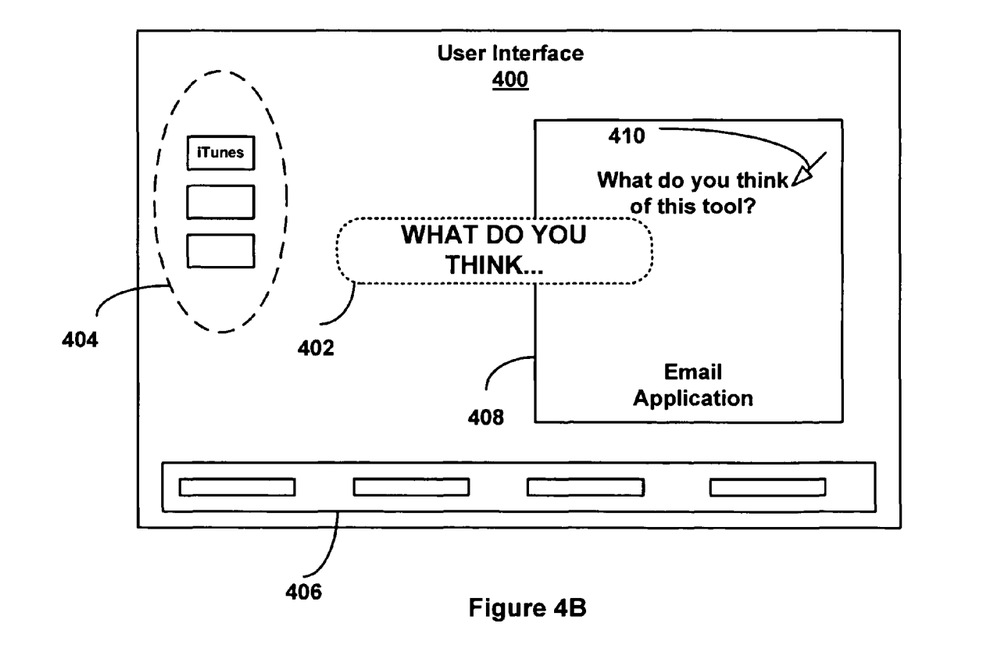
FIG. 4B is an illustration of a user interface displaying enhanced feedback in a caption panel in response to interaction with an application.

After the enhanced feedback is determined, a caption panel is displayed within a user interface (306) and the enhanced feedback is displayed in the caption panel (308), as shown in FIGS. 4A and 4B. The display of the caption panel can be performed before, after or concurrently with the determination of the enhanced feedback. In some implementations, the caption panel is displayed conspicuously, such as in the center of the user interface. In some implementations, a user can change the size or location of the caption panel with a mouse, keyboard or other input device. For example, a user can resize the caption panel as desired to allow for the display of more or less text. Further, in some implementations, caption panel attributes (e.g., font size, color, style, effects, etc.) and background attributes (e.g., background in the caption panel and/or the user interface) can be selected by the user via, for example, a preference panel or similar input mechanism. In some implementations, background attributes include but are not limited to: color, transparency, pattern and other effects. In some implementations, attributes for text output can be selected by the user or an application, including, for example, displaying large text with white letters on a black background to improve text visibility. In some implementations, enhanced feedback from similar or related interaction events can be displayed in a common format or with similar enhanced attributes (e.g., same font, style, etc.) to create uniformity and consistency.

It should be apparent that the caption panel is not dedicated to any particular item in the user interface. Rather, one or more caption panels can be used to display enhanced feedback for one or more interactions with one or more items in the user interface. Moreover, the caption panel does not have to be proximate or near the subject item, and can be located anywhere on the user interface. By locating the caption panel in a conspicuous location (e.g., the center of the user interface), interactions that may relate to various different levels of a user interface (e.g., desktop level, application, etc.) can be presented at a common location in the user interface in a uniform or consistent manner.

Caption Panel Examples

FIG. 4A is an illustration of a user interface 400 displaying text feedback in a caption panel 402 in response to interaction with a desktop item. The user interface 400 includes icons 404, an application bar 406, application window 408 and cursor 410. As shown in FIG. 4A, a user has hovered the cursor 410 over an iTunes® icon 404, and subsequently selected the iTunes® icon 404 to launch the iTunes® client application. The caption panel 402 is displayed in the center of the user interface 400 and includes the text (e.g., "Launching iTunes®"). Clicking on the iTunes® icon 404 to invoke the iTunes® client application triggered a user interaction event (e.g., clicking the iTunes® icon). The user interaction event was detected by the operating system as a command. The command was performed by the operating system (e.g., iTunes® application was invoked) and mapped to a predetermined text output for display in the caption panel 402.

FIG. 4B is an illustration of the user interface 400 displaying text feedback in the caption panel 402 in response to interaction with an application (e.g., an email application). As shown in FIG. 4B, a user has launched an email application that presented a window 408 in which an email text message is displayed. An accessibility application or operating system component reads a portion of the text, and/or other information or metadata relevant to the text (e.g., "What do you think . . . ") and displays it in the caption panel 402.

Interaction Panel Examples

Figure 5A:
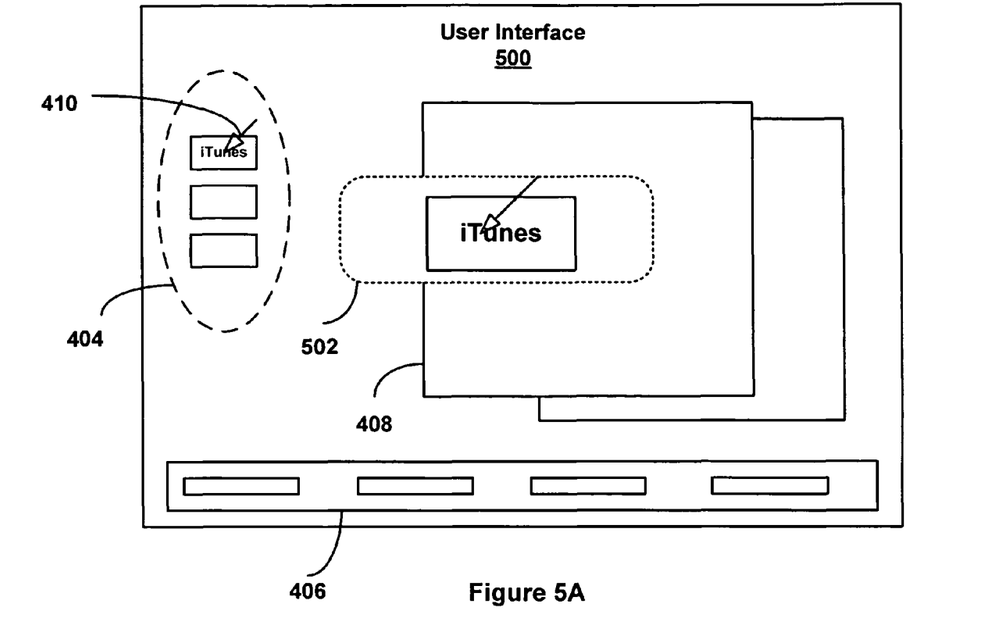
FIG. 5A is an illustration of a user interface displaying enhanced feedback in an interaction panel in response to interaction with a desktop item.

FIG. 5A is an illustration of a user interface 500 displaying feedback in an interaction panel 502 in response to interaction with a desktop item. As shown in FIG. 5A, the user interface 500 includes various items including icons 404, menu bar 406, application window 408 and cursor 410, as previously described with respect to FIGS. 4A and 4B. As shown in FIG. 4A, the user has hovered over and selected an iTunes® icon 410 that launches an iTunes® client application. Thus, FIG. 5A illustrates a user interaction at the desktop level. For this example, the user interaction resulted in the display of the iTunes® icon 410 in the interaction panel 502, which can be clicked by the user to invoke the iTunes® client application.

The difference between a caption panel 402 and an interaction panel 502 is that the interaction panel 502 can display dynamic items that can be interacted with via the interaction panel 502 to invoke actions or operations. For example, the user can invoke the iTunes® client application by clicking on the iTunes® icon in the interaction panel 502. By contrast, the caption panel 402 displays static items, such as simple text.

Figure 5B:
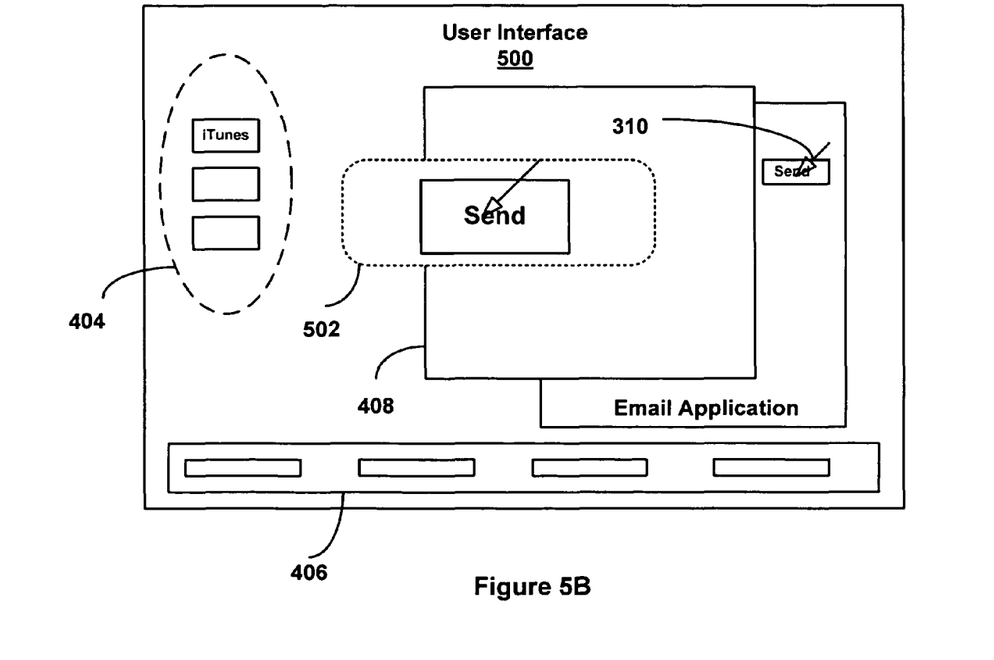
FIG. 5B is an illustration of a user interface displaying enhanced feedback in an interaction panel in response to interaction with an application.

In FIG. 5B, the interaction event is the sending of an e-mail message from the launched iTunes® application. The interaction panel 502 displays the "send" button of the email application, which can be displayed in the interaction panel 502 concurrently with the interaction event. Thus, FIG. 5B illustrates a user interaction at the application level.

Various modifications can be made to the disclosed implementations and still be within the scope of the following claims.

What is claimed is:

1. A method, comprising:
receiving, using one or more processing units, a request to visually enhance one or more items within a graphical interface, wherein each item includes one or more attributes, and wherein visually enhancing the one or more items includes modifying an attribute associated with each item;
determining, using the one or more processing units, enhanced feedback corresponding to the request, wherein determining enhanced feedback includes converting the request into a command that is mapped to a pre-determined output;
using, using the one or more processing units, the pre-determined output to generate a panel, wherein the panel is configured to be both a static caption panel or a dynamic interactive panel, wherein the pre-determined output in a dynamic interactive panel includes the visually enhanced one or more items, wherein activating a visually enhanced item in a dynamic interactive panel invokes an interaction event, and wherein each visually enhanced item in a dynamic interactive panel corresponds to an item within the graphical interface that is configured to invoke the same interaction event; and
invoking, using the one or more processing units, the interaction event when the panel is a dynamic interactive panel, wherein the interaction event is invoked using either the visually enhanced item or the corresponding item.

2. The method of claim 1, wherein the request is generated manually or automatically.

3. The method of claim 1, wherein the one or more items are part of a desktop or generated by an application.

4. The method of claim 1, wherein current interaction with the one or more items causes the one or more items to be visually enhanced.

5. The method of claim 1, wherein the panel is displayed within a conspicuous location.

6. The method of claim 1, wherein when the one or more items are visually enhanced, the graphical interface is simultaneously altered.

7. The method of claim 1, wherein the pre-determined output is from a plurality of sources that are concatenated or otherwise combined.

8. The method of claim 1, wherein the pre-determined output is parsed for symbols, and wherein parsing includes outputting a word or phrase that corresponds to a symbol.

9. The method of claim 1, wherein the panel includes one or more modifiable attributes.

10. The method of claim 1, wherein enhanced feedback from similar or related requests is displayed in a common format.

11. The method of claim 1, wherein the interaction event is an action or operation.

12. The method of claim 1, wherein the interaction event is launching an application.

13. The method of claim 1, wherein the interaction event includes an audio output.

14. A system, comprising:
one or more processors;
a computer-readable storage medium containing instructions configured to cause the one or more processors to perform operations, including:
receiving a request to visually enhance one or more items within a graphical interface, wherein each item includes one or more attributes, and wherein visually enhancing the one or more items includes modifying an attribute associated with each item;
determining enhanced feedback corresponding to the request, wherein determining enhanced feedback includes converting the request into a command that is mapped to a pre-determined output;
using the pre-determined output to generate a panel, wherein the panel is configured to be both a static caption panel or a dynamic interactive panel, wherein the pre-determined output in a dynamic interactive panel includes the visually enhanced one or more items, wherein activating a visually enhanced item in a dynamic interactive panel invokes an interaction event, and wherein each visually enhanced item in a dynamic interactive panel corresponds to an item within the graphical interface that is configured to invoke the same interaction event; and
invoking the interaction event when the panel is a dynamic interactive panel, wherein the interaction event is invoked using either the visually enhanced item or the corresponding item.

15. The system of claim 14, wherein the request is generated manually or automatically.

16. The system of claim 14, wherein the one or more items are part of a desktop or generated by an application.

17. The system of claim 14, wherein current interaction with the one or more items causes the one or more items to be visually enhanced.

18. The system of claim 14, wherein the panel is displayed within a conspicuous location.

19. The system of claim 14, wherein when the one or more items are visually enhanced, the graphical interface is simultaneously altered.

20. The system of claim 14, wherein the pre-determined output is from a plurality of sources that are concatenated or otherwise combined.

21. The system of claim 14, wherein the pre-determined output is parsed for symbols, and wherein parsing includes outputting a word or phrase that corresponds to a symbol.

22. The system of claim 14, wherein the panel includes one or more modifiable attributes.

23. The system of claim 14, wherein enhanced feedback from similar or related requests is displayed in a common format.

24. The system of claim 14, wherein the interaction event is an action or operation.

25. The system of claim 14, wherein the interaction event is launching an application.

26. The system of claim 14, wherein the interaction event includes an audio output.

27. A computer-program product, tangibly embodied in a machine-readable storage medium, including instructions configured to cause a data processing apparatus to:
   receive a request to visually enhance one or more items within a graphical interface, wherein each item includes one or more attributes, and wherein visually enhancing the one or more items includes modifying an attribute associated with each item;
   determine enhanced feedback corresponding to the request, wherein determining enhanced feedback includes converting the request into a command that is mapped to a pre-determined output;
   use the pre-determined output to generate a panel, wherein the panel is configured to be both a static caption panel or a dynamic interactive panel, wherein the pre-determined output in a dynamic interactive panel includes the visually enhanced one or more items, wherein activating a visually enhanced item in a dynamic interactive panel invokes an interaction event, and wherein each visually enhanced item in a dynamic interactive panel corresponds to an item within the graphical interface that is configured to invoke the same interaction event; and
   invoke the interaction event when the panel is a dynamic interactive panel, wherein the interaction event is invoked using either the visually enhanced item or the corresponding item.

28. The computer-program product of claim 27, wherein the request is generated manually or automatically.

29. The computer-program product of claim 27, wherein the one or more items are part of a desktop or generated by an application.

30. The computer-program product of claim 27, wherein current interaction with the one or more items causes the one or more items to be visually enhanced.

31. The computer-program product of claim 27, wherein the panel is displayed within a conspicuous location.

32. The computer-program product of claim 27, wherein when the one or more items are visually enhanced, the graphical interface is simultaneously altered.

33. The computer-program product of claim 27, wherein the pre-determined output is from a plurality of sources that are concatenated or otherwise combined.

34. The computer-program product of claim 27, wherein the pre-determined output is parsed for symbols, and wherein parsing includes outputting a word or phrase that corresponds to a symbol.

35. The computer-program product of claim 27, wherein the panel includes one or more modifiable attributes.

36. The computer-program product of claim 27, wherein enhanced feedback from similar or related requests is displayed in a common format.

37. The computer-program product of claim 27, wherein the interaction event is an action or operation.

38. The computer-program product of claim 27, wherein the interaction event is launching an application.

39. The computer-program product of claim 27, wherein the interaction event includes an audio output.

* * * * *